(12) United States Patent
Mc Grath

(10) Patent No.: US 6,254,040 B1
(45) Date of Patent: Jul. 3, 2001

(54) MOUNTING ANGLE CLAMP FOR ATTACHING ADDITIONAL STRUCTURES TO HANGING ROD

(76) Inventor: William James Mc Grath, 19 Parker Bridge Rd., Andover, CT (US) 06232

( * ) Notice: Subject to any disclaimer, the term of this patent is extended or adjusted under 35 U.S.C. 154(b) by 0 days.

(21) Appl. No.: 09/178,053

(22) Filed: Oct. 26, 1998

(51) Int. Cl.[7] .................................................. F16L 3/00
(52) U.S. Cl. ............................................ 248/62; 248/68.1
(58) Field of Search ................................ 248/62, 60, 65, 248/68.1

(56) References Cited

U.S. PATENT DOCUMENTS

| | | | |
|---|---|---|---|
| 1,546,839 | * | 7/1925 | Klingel ................................. 439/814 |
| 5,022,614 | * | 6/1991 | Rinderer ................................. 248/62 |
| 5,188,317 | * | 2/1993 | Roth ..................................... 248/59 |
| 5,251,857 | * | 10/1993 | Grice et al. ........................... 248/62 |
| 5,344,108 | * | 9/1994 | Heath ................................... 248/62 |

* cited by examiner

Primary Examiner—Ramon O. Ramirez
(74) Attorney, Agent, or Firm—Richard T. Holzmann

(57) ABSTRACT

A fastening and supporting device adapted to being clamped to a vertically placed hanger, usually a threaded rod, comprising: a main clamp body portion for securing the fastening and support device to the vertically placed hanger; a pair of locking hooks portion facing in opposed directions juxtapositioned for longitudinally gripping the hanger by first positioning said body portion horizontally to engage the hanger and next rotating thereto in a longitudinal aspect to the hanger for supporting said body portion and said hooks against the hanger; and a mounting angle portion for attachment to a strut means for supporting a conduit. The main clamp body, locking hooks and mounting angle portions are integrally cast from the group consisting of iron, aluminum, fiberglass reinforced polycarbonate, and fiber composites. A second embodiment includes two mounting angles at right angles. A method for attachment of the clamp anywhere between the endpoints of the hanger.

5 Claims, 7 Drawing Sheets

MOUNTING ANGLE CLAMP FOR ATTACHING ADDITIONAL STRUCTURES TO HANGING ROD

FIELD OF THE INVENTION

This invention relates to a clamp, and particularly one which clamps readily to existing hanging threaded rod.

BACKGROUND

It is often desired to secure an elongated object or other shaped object to some other object. For example, the present invention relates to fastening and supporting devices for the securement, typically at elevated levels, at or near the level of a ceiling, of selected conduits including, without limitation, electrical and fluid conduits, as well as for supporting insulation and lath.

Fastening and supporting devices which are adapted to be secured to a supporting surface by means of existing threaded rod hangers are of growing importance. With the advent of computers and various telecommunication systems, the number of wires and cables which need to be installed in the space between ceilings and floors and between walls continues to increase very rapidly. This is also true for other types of conduits used for various plumbing, air conditioning and heating applications. Many of these have to be retrofit to existing and much older structures which lack even the simplest supporting devices.

Conventional hangers for supporting such conduits and ductwork need to be drilled into concrete surfaces usually in relatively inaccessible places which require significant expense and considerable man-hours in a not especially safe environment. Various devices have been proposed but they have been found to involve a complicated and expensive manufacturing procedure, to have limited application, to require special tools for their application, or to suffer from other disadvantages.

It is common practice in commercial construction today to embed in concrete ceilings, before finishing the interior, threaded rods hanging vertically therefrom for supporting main drainage piping from sinks, toilets, floor drains and the like. These rods are normally on 4 feet to 12 feet centers depending upon the weight and type of the conduit, pipe, etc. to be hung from the ceiling.

Subsequently, when electricians and plumbers arrive to install wiring and wiring harnesses, piping, ducting and HVAC tubing, for example, it is the practice for them to drill additional holes in the concrete to install supplemental rods in high, often out-of-the-way tight locations for hanging the products associated with their work. This is time consuming, inconvenient, tedious, sometimes hazardous, involves additional materials and is, therefore, expensive. Further, the process of servicing such conduits once installed, is prone to the same problems.

There are, of course, many types of commercially available supports available for hanging beams and conduits from such vertical three-eighths and one-half inch threaded rods having utility in residential, commercial and industrial environments. However, these are invariably affixed to the ends of the rod since this is the only way they can be seated. For example in FIG. 1 is shown a trapeze support and in FIG. 2 a pipe or conduit hanger which illustrates this principle.

None of the above, nor other prior art known to the inventor, disclose a device which not only may be readily affixed anywhere between the ends of an existing rod already having structure attached to the end thereof, but which may then provide the bracket structure to allow a third element to be mounted thereto such as for the selective inclusion of electrical and fluid conduits and the like and for the selective decoupling therefrom if necessary.

There are, of course, many types of clamps available in the market for not only merely clamping things together, but also to allow a third element to be mounted thereon. For example, a conduit bracket lock system disclosed in U.S. Pat. No. 4,973,014 issued to Daigle et al is a constructional surface engagement element having radially projecting elements for nestingly resiliently engaging a pipe, conduit or cable. Whereas, U.S. Pat. No. 5,590,567 issued to Marrs et al and U.S. Pat. No. 4,953,801 issued to Oikawa are concerned with devices for clipping or snapping in place a holder or retainer to be mounted for supporting a cable or other elongated object such as a wiring harness in automotive applications. However, none of these are suited to alleviate the problems presented above.

In response to the above described limitations in the prior art, the present invention is directed. The instant invention is designed to rotate and lock on at any point on the rod between the connection at the top and the bottom of the rod. Furthermore, this device allows for a mounting surface to be suspended from the threaded rod. This surface will then allow any type of structural bar or other device to be mounted vertically or horizontally from the hanging rod.

Thus, it is an object of the instant invention to provide a device which will avoid the need to drill additional holes in ceiling concrete and embed therein new hangers for affixing thereto the various additional components required in modern building construction.

It is an object of the present invention to provide an improved fastening device of the character indicated which can be secured to a ceiling easily and rapidly, and which can be satisfactorily used without special tools or implements.

Another feature of the invention resides in the structure of the device whereby the device may be adapted to support either piping or other conduits or even sheet material such as insulation boards and blankets.

It is an additional object to achieve this objective by utilizing the existing hanging rods as the constructional surface engagement element in these out-of-the-way, somewhat hazardous locations.

It is a further object of the invention to achieve the above objects by utilization of a clamping device which is simply inserted on the pre-existing threaded rod horizontally and then rotated so as to lock its hooks around the threaded rod and thereafter locking the clamp in place by means of a screw or bolt with a jam nut preventing the screw or nut from backing off.

It is accordingly an object of the present invention to provide an improved conduit bracket lock system.

It is another object of the present invention to provide conduit bracket lock systems having particular utility in the suspension of electrical and fluid conduits at or near the line of interconnection between walls and ceilings of residential, commercial and industrial structures.

It is another object of the present invention adapted for ease of installation and servicing of the secured conduit.

It is therefore an object of the invention to secure an elogated object in place by a retainer having low insertion force and strong resistance to unwanted removal, and is ergonomically easy to install.

Still another object is a retainer system that restrains an elongated object in most or all degrees of freedom and particularly is strong in the axial direction.

The above and yet other objects and advantages will become apparent in the hereinafter set forth detailed description of the invention, the drawings, and claims appended herewith.

The instant invention is formed of components which may be selectively coupled together as to form common connections between all components thereof, thereby alleviating the need for much of the laborious aspects associated with installation of conduits as has been known in the prior art.

SUMMARY OF THE INVENTION

A fastening and supporting device adapted to being clamped to a vertically placed hanger comprising: a main clamp body portion having a tapped hole therein for securing the fastening and support device to the vertically placed hanger; a pair of locking hooks portion including end portions facing in opposed directions juxtapositioned for longitudinally gripping the hanger by first positioning said body portion horizontally to engage the hanger and next rotating thereto in a longitudinal aspect to the hanger for supporting said body portion and said hooks against the hanger; and a mounting angle portion having a hole therein for attachment to a strut means for supporting a conduit.

This device further comprises a first locking bolt and jam nut set for insertion into the tapped hole of said main clamp body portion and upon tightening, forces said bolt against the hanger and said jam nut against said main clamp body portion preventing back-off thereof, and a second locking bolt and jam nut set for fastening said strut means to said mounting angle through said mounting angle hole. The material of the main clamp body, locking hooks and mounting angle portions are integrally cast and selected from the group consisting of iron, aluminum, fiberglass reinforced polycarbonate, and fiber composites. The vertically placed hanger is a threaded rod.

In a second embodiment of the instant invention, the main clamp body portion includes two mounting angle portions placed at right angles to each other and each having a hole therein for attachment respectively to two strut means for supporting two or more conduits.

A method for clamping a fastening and support device to a vertically placed hanger is disclosed comprising the steps of: placing the clamp in a horizontal position with respect to the vertical hanger; moving said clamp forward allowing said hooks to lie horizontal with respect to an imaginary plane drawn through the longitudinal center of the hooks; rotating said clamp 90 degrees allowing said device to lie parallel to the hanger; and locking a bolt and jam nut into contact with the hanger to prevent said bolt from backing-off.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
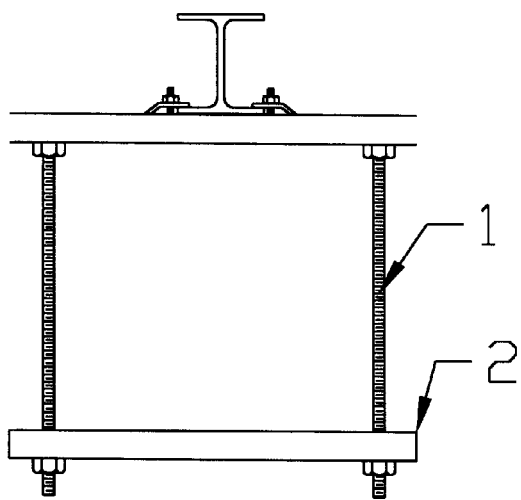
FIG. 1 is a perspective front view of a conventional trapeze support affixed to the bottom of two threaded rods; . . . Prior Art
Figure 2:
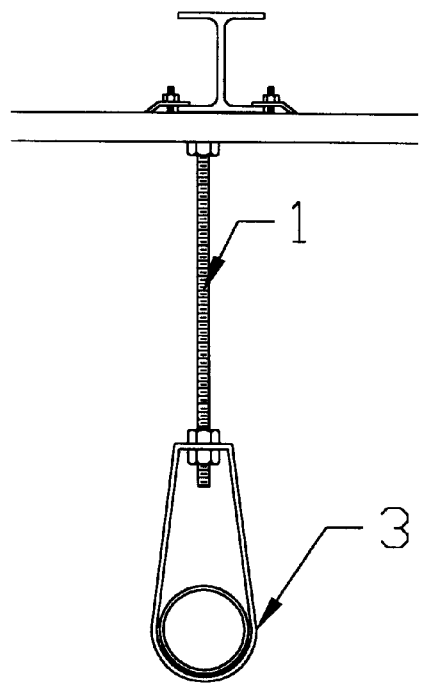
FIG. 2 is a perspective front view of a conventional pipe hanger affixed to the bottom of a single threaded rod; . . . Prior Art

Before describing the present invention, reference will be made to FIGS. 1 and 2 showing conventional means for affixing various support devices to the typical hanging threaded rods available in contemporary residential, commercial and industrial buildings. FIG. 1 illustrates a trapeze support attached to the bottom of two hanging rods to which other clamps, brackets and the like can be mounted. FIG. 2, on the other hand, shows a single threaded hanging rod to which a pipe hanger, for example, can be attached. In both instances, these supports are screwed onto the bottom of the threaded rod.

The problem arises when after these devices are installed, additional ductwork and conduits, for example, need to be placed for telecommunications wiring, cable, air conditioning, heating or plumbing modifications, and the like. Typically, as pointed out above, craftsmen drill additional sites in the structural framework for placement of more hanging rods. The point of the instant invention was to develop a clamp which easily lends itself to placement on the pre-existing rods thereby avoiding this considerable additional expense in time and money and reducing the occupational hazard involved in this kind of work.

Of course, while the driving force for the development of this invention was to overcome the above-mentioned problems, it should be clear that this clamp may be fixed to any type of rod, threaded or not, hanging or not, disposed in various different attitudes.

Figure 3:
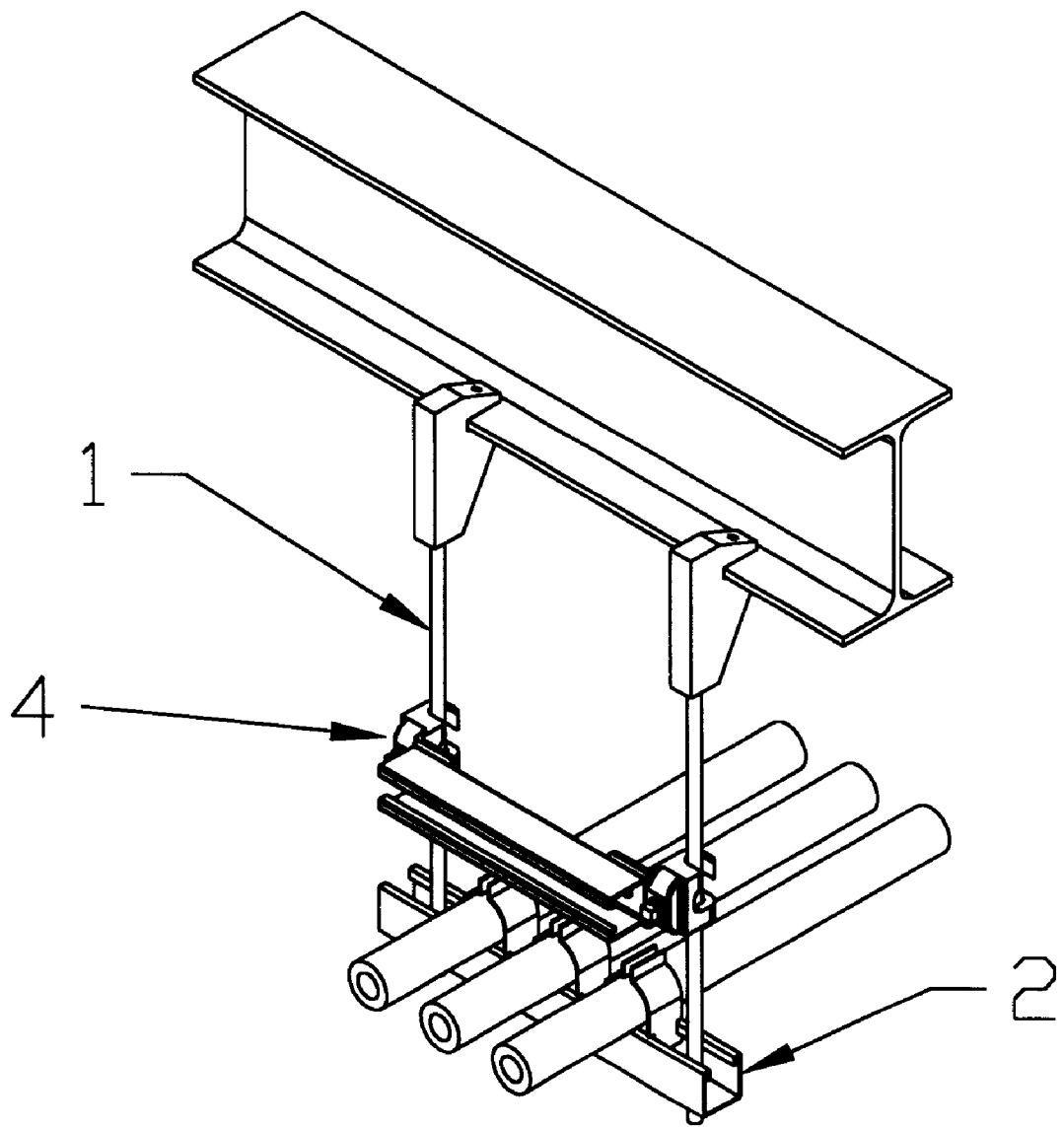
FIG. 3 is a perspective front view of FIG. 1 with a clamp of the subject invention in place on a rod.

FIG. 3 shows FIG. 1 with a clamp of this invention attached directly to the threaded rod between the bottom and the top thereof. Even multiple clamps of this inventive design can be attached to either one or both of the rods of FIG. 1 so long as the load they carry is within the capability of the original system. One might therefore add additional trapeze-like supports to the same two rods provided that the load bearing capabilities are acceptable.

With the clamps of the present invention in place, one can then begin adding various kinds of struts and supports to achieve the objective of installing the cable, duct or conduit required for the particular job. The detail of the invention is shown in FIGS. 4 through 8.

Figure 4:
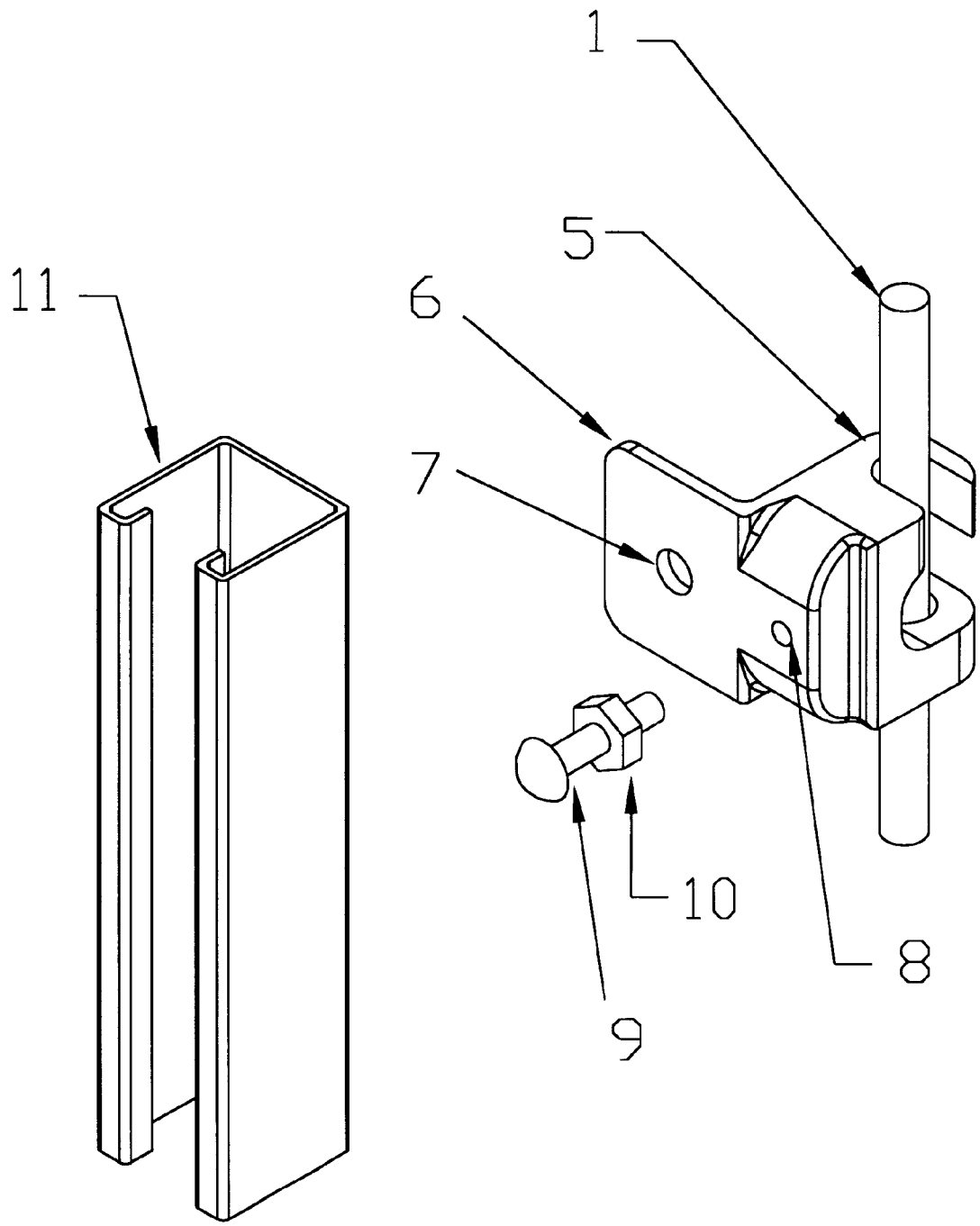
FIG. 4 is an isometric view of the invention.

Proceeding to FIG. 4, the details of clamp 4 can be seen. The clamp 4 is in place about a hanging threaded rod 1 (threads not shown). Clamp 4 has simply been "inserted" on threaded rod 1 horizontally and rotated 90 degrees to position the main body threaded rod locking hooks 5 about clamp 4. Locking bolt 9 with jam nut 10 thereon has previously been placed in the main body tapped hole 8. Then bolt 9 is tightened against threaded rod 1 so as to lock clamp 4 in place. Jam nut 10 is then tightened against the back of clamp 4 so that bolt 9 can not back off. The mounting angle 6 having mounting angle hole 7 therein is now in position to receive strut 11.

Figure 5:
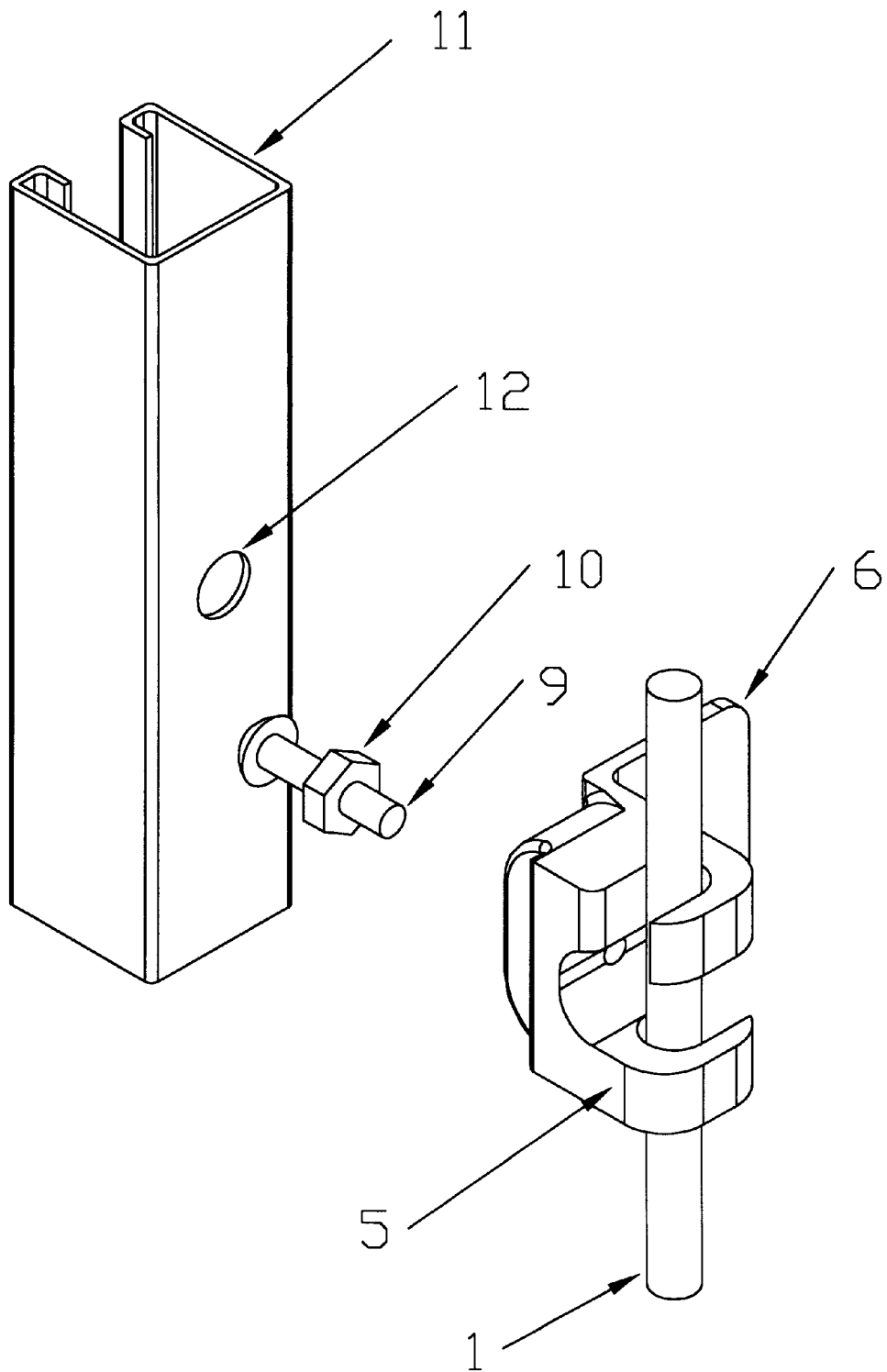
FIG. 5 is an isometric view of the reverse side of FIG. 4.

FIG. 5, an isometric view of the reverse side of FIG. 4, shows strut 11 having strut mounting hole 12 therein for fastening strut 11 to mounting angle 6 by any conventional fastening means. With strut 11 so mounted, conduits for cable, water, gas, etc. can in turn be mounted thereon. Of course, strut 11 is only one type of supporting structure which can be used for this intended purpose; many other types are commercially available and can be used with the type clamp of this invention.

Figure 6:
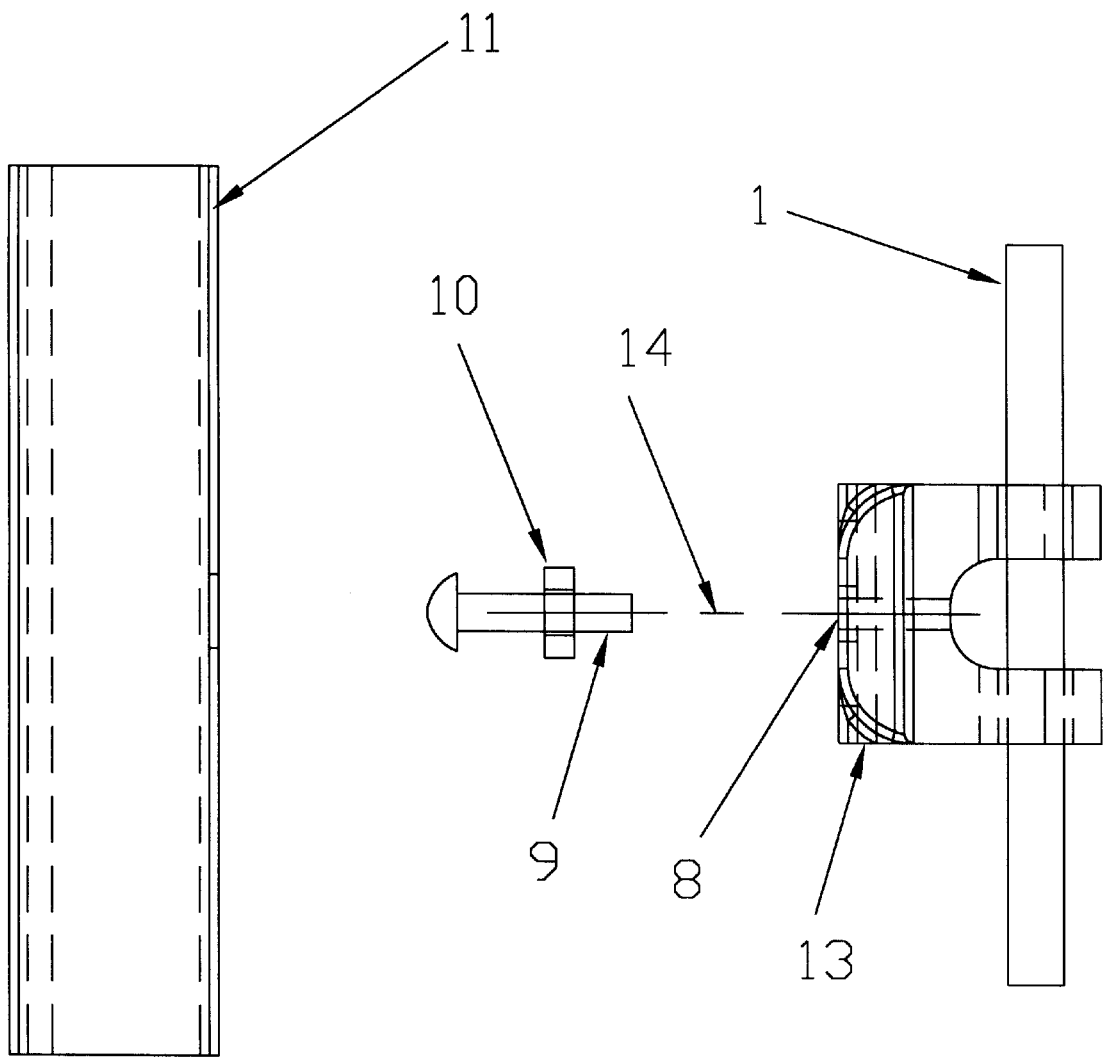
FIG. 6 is a top plan view of the invention.

FIG. 6, a top plane view of the invention, illustrates the center line 14 of locking bolt 9 for fastening to the main body 13 of clamp 4.

Figure 7:
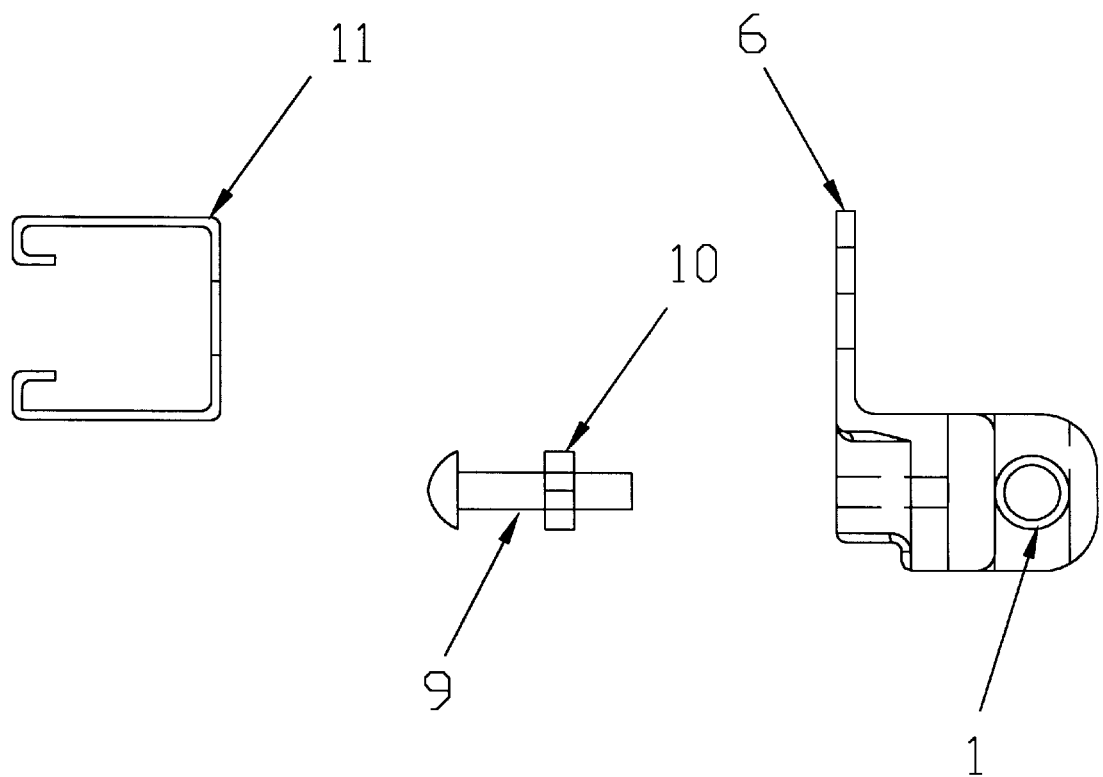
FIG. 7 is a top view of the invention.
Figure 8:
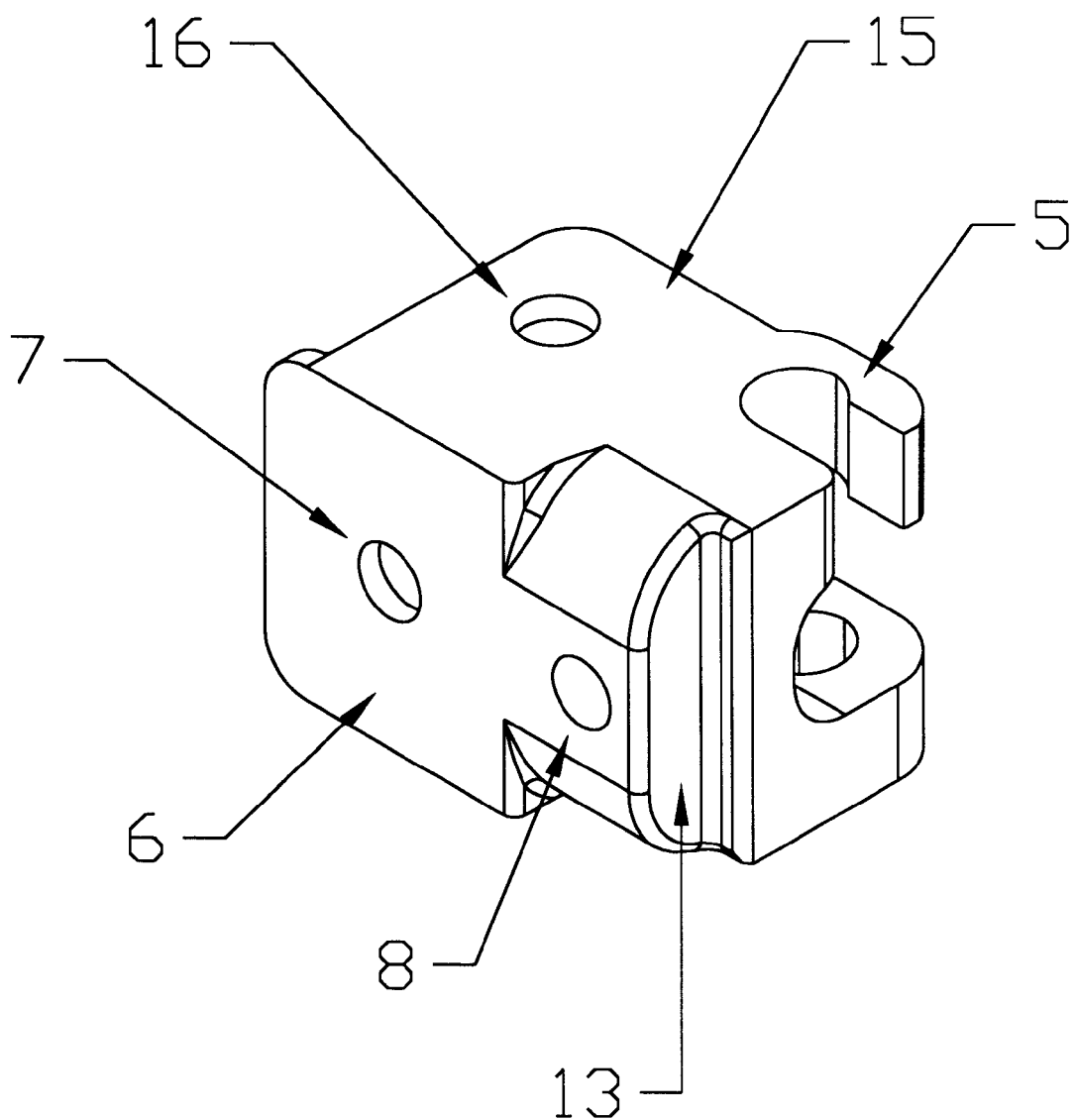
FIG. 8 is an isometric view of the clamp of the invention of FIG. 4 having a second mounting angle.

FIG. 7 is a top view of the invention, while FIG. 8 is an isometric view of clamp 4 of FIG. 4 having a second mounting angle 15 which latter having a second mounting angle hole 16 therein for supporting an additional strut. Thus, two struts at right angles to each other can be supported by a single clamp of the invention.

The advantages of the invention are simplicity of design, the main body of which is of one-piece construction allowing installation with merely a quick twist and tightening of a single bolt. The manufacturing of this device uses a common casting process in a number of types of materials which are common to the industry. The design of the product eliminates the use of many and speciality tools and a number of procedures for installation. This is a quick and easy way of installing many kinds of support on existing hanging threaded rods.

There are a number of possible materials which may be used such as cast aluminum, cast iron, or even molded plastics such as fiberglass reinforced polycarbonate or fiber composites. Cast aluminum performs extremely well. A plastic version is possible for the telecommunications industry or for those applications requiring a light duty use. A clipped on version is also possible, however, the most practical design is to have a clamp bolt that allows for positive locking to the threaded rod. This essentially eliminates any possible slipping down the length of the rod and it also permits the use of this one type of clamp on different size rods.

The cost of the commercial manufacture of this device is competitive with other products used for similar purposes being sold in the industry; but, the cost of installation, as pointed out above, is substantially reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fastening and supporting device adapted to being clamped to a vertically placed hanger comprising:
   a main clamp body portion having a tapped hole therein for securing the fastening and support device to the vertically placed hanger;
   a pair of locking hooks portion including end portions facing in opposed directions juxtapositioned for longitudinally gripping the hanger by first positioning said body portion horizontally to engage the hanger and next rotating thereto in a longitudinal aspect to the hanger for supporting said body portion and said hooks against the hanger; and
   a mounting angle portion having a hole therein for attachment to a strut means for supporting a conduit.

2. The device of claim 1 further comprising a first locking bolt and jam nut set for insertion into the tapped hole of said main clamp body portion and upon tightening, forces said bolt against the hanger and said jam nut against said main clamp body portion preventing back-off thereof.

3. The device of claim 1 further comprising a second locking bolt and jam nut set for mounting said strut means to said mounting angle through said mounting angle hole.

4. The device of claim 1 wherein the main clamp body, locking hooks and mounting angle portions are integrally cast selected from the group consisting of iron, aluminum, fiberglass reinforced polycarbonate, and fiber composites.

5. A fastening and supporting device adapted to being clamped to a vertically placed hanger comprising:
   a main clamp body portion having a tapped hole therein for securing the fastening and support device to the vertically placed hanger;
   a pair of locking hooks portion including end portions facing in opposed directions juxtapositioned for longitudinally gripping the hanger by first positioning said body portion horizontally to engage the hanger and next rotating thereto in a longitudinal aspect to the hanger for supporting said body portion and said hooks against the hanger; and
   two mounting angle portions placed at right angles to each other and each having a hole therein for attachment respectively to two strut means for supporting two or more conduits.

* * * * *